(12) United States Patent
Welch et al.

(10) Patent No.: US 10,120,126 B2
(45) Date of Patent: *Nov. 6, 2018

(54) METHOD AND SYSTEM FOR PARTIAL INTEGRATION OF WAVELENGTH DIVISION MULTIPLEXING AND BI-DIRECTIONAL SOLUTIONS

(71) Applicant: Luxtera, Inc., Carlsbad, CA (US)

(72) Inventors: Brian Welch, San Diego, CA (US);
Attila Mekis, Carlsbad, CA (US);
Steffan Gloeckner, San Diego, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,467

(22) Filed: Dec. 4, 2017

(65) Prior Publication Data

US 2018/0156973 A1 Jun. 7, 2018

Related U.S. Application Data

(63) Continuation of application No. 15/269,104, filed on Sep. 19, 2016, now Pat. No. 9,841,560.

(Continued)

(51) Int. Cl.
*H04J 14/00* (2006.01)
*H04J 14/02* (2006.01)

(Continued)

(52) U.S. Cl.
CPC ......... *G02B 6/12004* (2013.01); *G02B 6/124* (2013.01); *G02B 6/125* (2013.01);

(Continued)

(58) Field of Classification Search
CPC .. H04B 10/677; H04B 10/69; H04B 6/29383; H04B 10/40; H04B 10/801;

(Continued)

(56) References Cited

U.S. PATENT DOCUMENTS 7,136,546 B2 * 11/2006 Kish, Jr. ............... B82Y 20/00
385/14
7,885,492 B2 * 2/2011 Welch .................. B82Y 20/00
385/14

(Continued)

*Primary Examiner* — Tesfaldet Bocure
(74) *Attorney, Agent, or Firm* — McAndrews, Held & Malloy

(57) ABSTRACT

Methods and systems for partial integration of wavelength division multiplexing and bi-directional solutions are disclosed and may include, an optical transceiver on a silicon photonics integrated circuit coupled to a planar lightwave circuit (PLC). The silicon photonics integrated circuit may include a first modulator and first light source that operates at a first wavelength and a second modulator and second light source that operates at a second wavelength. The transceiver and PLC are operable to modulate a first continuous wave (CW) optical signal from the first light source utilizing the first modulator and modulate a second CW optical signal from the second light source utilizing the second modulator. The modulated signals may be communicated from the modulators to the PLC utilizing a first pair of grating couplers in the IC and combined in the PLC.

20 Claims, 10 Drawing Sheets

Related U.S. Application Data

(60) Provisional application No. 62/220,840, filed on Sep. 18, 2015.

(51) Int. Cl.

| | | |
|---|---|---|
| *G02B 6/12* | (2006.01) | |
| *H04B 10/40* | (2013.01) | |
| *H04B 10/80* | (2013.01) | |
| *G02B 6/124* | (2006.01) | |
| *G02B 6/125* | (2006.01) | |
| *G02B 6/293* | (2006.01) | |
| *G02B 6/42* | (2006.01) | |

(52) U.S. Cl.
CPC ....... *G02B 6/29386* (2013.01); *G02B 6/4213* (2013.01); *G02B 6/4215* (2013.01); *G02B 6/4246* (2013.01); *H04B 10/40* (2013.01); *H04B 10/801* (2013.01); *H04J 14/0256* (2013.01); *G02B 2006/12142* (2013.01)

(58) Field of Classification Search
CPC .. H02B 6/29383; H04J 14/02; H04J 14/0202; H04J 14/0213; H04J 14/0256; G02B 6/34; G02B 6/12004; G02B 6/124; G02B 6/125; G02B 6/29386; G02B 6/4246; G02B 6/4215; G02B 6/4213
USPC .................................. 398/79, 82, 83, 84, 65
See application file for complete search history.

(56) References Cited

U.S. PATENT DOCUMENTS

| | | | | |
|---|---|---|---|---|
| 8,594,503 | B2* | 11/2013 | Roelkens | G02B 6/12007 385/15 |
| 9,166,678 | B1* | 10/2015 | Fish | H04B 10/00 |
| 9,389,441 | B2* | 7/2016 | Coult | G02B 6/42 |
| 9,467,227 | B2* | 10/2016 | Masini | H04B 10/0779 |
| 2008/0025350 | A1* | 1/2008 | Arbore | G02B 6/12011 372/20 |
| 2010/0322555 | A1* | 12/2010 | Vermeulen | G02B 6/12007 385/28 |
| 2011/0305416 | A1* | 12/2011 | Mekia | G02B 6/4239 385/28 |
| 2012/0301149 | A1* | 11/2012 | Pinguet | H01L 21/84 398/115 |
| 2014/0241721 | A1* | 8/2014 | Xia | H04J 14/02 398/51 |
| 2015/0219847 | A1* | 8/2015 | Mack | G02B 6/4286 385/14 |
| 2015/0381273 | A1* | 12/2015 | Gloeckner | H04B 10/40 398/16 |
| 2016/0036550 | A1* | 2/2016 | Welch | G02B 6/4215 398/87 |
| 2016/0119057 | A1* | 4/2016 | Mekis | H04J 14/02 398/51 |
| 2016/0156999 | A1* | 6/2016 | Liboiron-Ladouceur | H04Q 11/0005 398/51 |
| 2016/0238793 | A1* | 8/2016 | Frankel | G02B 6/305 |
| 2016/0246018 | A1* | 8/2016 | Pinguet | H01L 21/84 |
| 2016/0320576 | A1* | 11/2016 | Mack | G02B 6/4286 |
| 2016/0349544 | A1* | 12/2016 | Mekis | G02F 1/313 |

* cited by examiner

METHOD AND SYSTEM FOR PARTIAL INTEGRATION OF WAVELENGTH DIVISION MULTIPLEXING AND BI-DIRECTIONAL SOLUTIONS

CROSS-REFERENCE TO RELATED APPLICATIONS/INCORPORATION BY REFERENCE

This application is a continuation of U.S. application Ser. No. 15/269,104 filed on Sep. 19, 2016, now U.S. Pat. No. 8,841,104 issued on Dec. 12, 2017, which claims priority to and the benefit of U.S. Provisional Application 62/220,840 filed on Sep. 18, 2015, each of which is hereby incorporated herein by reference in its entirety.

FIELD

Certain embodiments of the disclosure relate to semiconductor photonics. More specifically, certain embodiments of the disclosure relate to a method and system for partial integration of wavelength division multiplexing and bi-directional solutions.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links. Conventional methods of wavelength division multiplexing (WDM) can be inefficient and/or ineffective.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for partial integration of wavelength division multiplexing and bi-directional solutions, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for partial integration of wavelength division multiplexing (CWDM) and bi-directional solutions. Exemplary aspects of the disclosure may comprise an optical transceiver on a silicon photonics integrated circuit coupled to a planar lightwave circuit (PLC). The silicon photonics integrated circuit includes a first modulator and first light source that operates at a first wavelength and a second modulator and second light source that operates at a second wavelength. The transceiver and PLC are operable to modulate a first continuous wave (CW) optical signal from the first light source utilizing the first modulator driven by a first electrical signal and modulate a second CW optical signal from the second light source utilizing the second modulator driven by a second electrical signal. First and second modulated signals may be communicated from the first and second modulators to the PLC utilizing a first pair of grating couplers in the silicon photonics integrated circuit. The first and second modulated signals may be combined in the PLC. A third modulated optical signal may be received via the PLC and split into fourth and fifth modulated optical signals in the PLC. The fourth and fifth modulated optical signals may be communicated to a second pair of grating couplers in the silicon photonics integrated circuit. The fourth modulated optical signal may be converted to a third electrical signal utilizing a first photodetector configured to detect at the first wavelength and the fifth modulated optical signal may be converted to a fourth electrical signal utilizing a second photodetector configured to detect at the second wavelength.

Figure 1A:
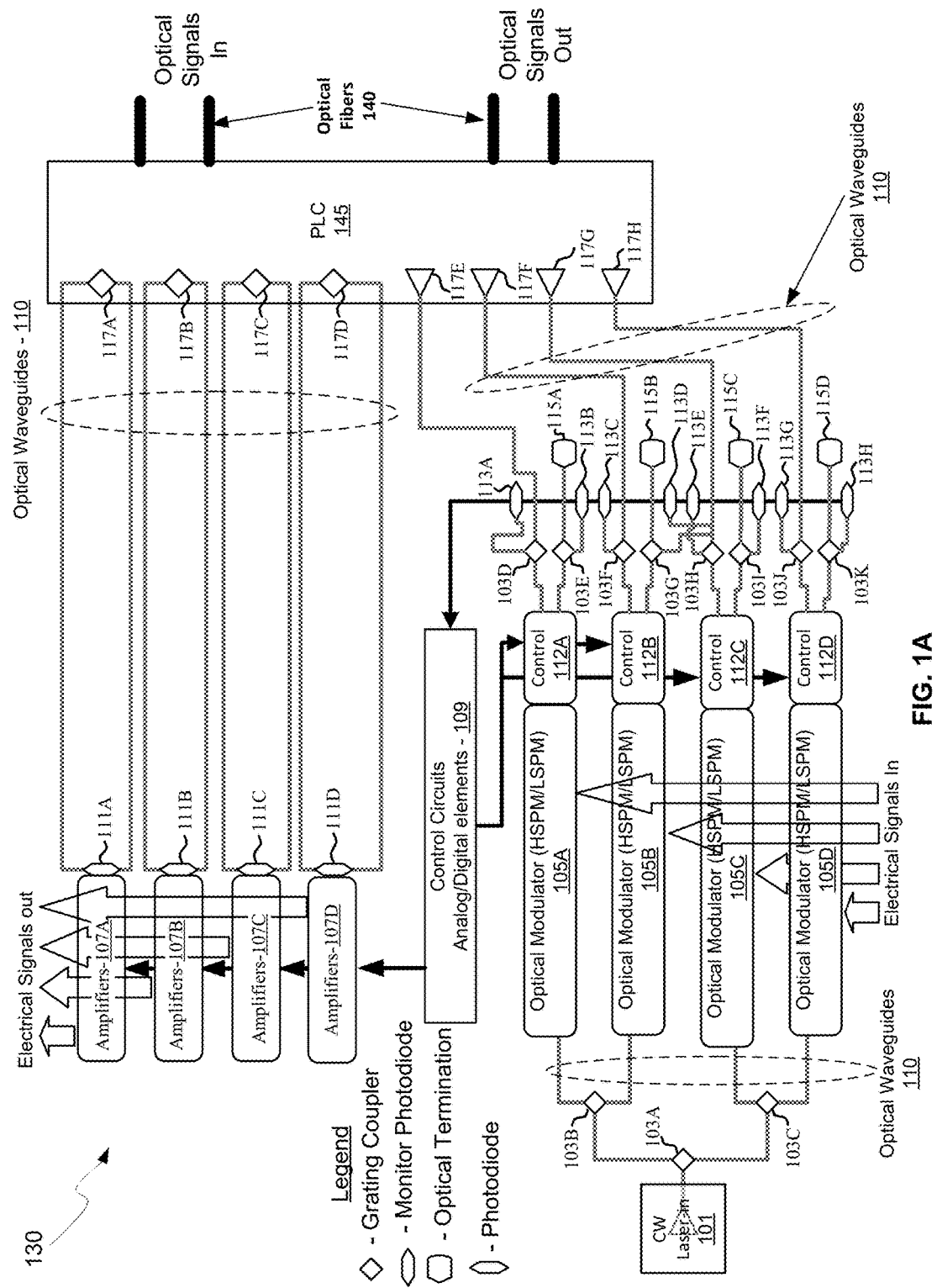
FIG. 1A is a block diagram of a photonically-enabled integrated circuit with partial integration of wavelength division multiplexing and bi-directional solutions, in accordance with an example embodiment of the disclosure.

FIG. 1A is a block diagram of a photonically-enabled integrated circuit with partial integration of wavelength division multiplexing and bi-directional solutions, in accordance with an example embodiment of the disclosure. Referring to FIG. 1A, there is shown optoelectronic devices on a silicon photonically-enabled integrated circuit (chip) 130 comprising optical modulators 105A-105D, photodiodes 111A-111D, monitor photodiodes 113A-113H, and optical devices comprising couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

A planar lightwave circuit (PLC) 145 may be coupled to the silicon photonic chip 130, aligned to the grating couplers 117A-117H, for communicating optical signals in and out of the silicon photonics integrated circuit 130. The PLC 145 may comprise optical and optoelectronics devices such as optical waveguides, splitters, directional couplers, interleaver multiplexers, and interleaver demultiplexers, for example. In addition, the PLC 145 may comprise one or more reflective surfaces for deflecting optical signals down into the photonics IC 130 or from the photonics ICs into optical fibers 140 coupled to the PLC 145.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators within for directing one or more CW optical signals to the coupler 103A. The photonically enabled integrated circuit 130 may comprise a single chip, or may be integrated on a plurality of die, such as with one or more electronics die and one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical power splitter, may comprise at least one input waveguide and at least two output waveguides. The couplers 103A-103C shown in FIG. 1A illustrates 1-by-2 splitters, which divide the optical power in one waveguide into two other waveguides evenly. These Y-junction splitters may be used in multiple locations in an optoelectronic system, such as in a Mach-Zehnder interferometer (MZI) modulator, e.g., the optical modulators 105A-105D, where a splitter and a combiner are needed, since a power combiner can be a splitter used in reverse.

In another example scenario, the Y-junction may be utilized in a parallel multi-channel transmitter, where a cascade of 1-by-2 splitters can be employed to have a single light source feed multiple channels. Interleaver-based multiplexers and demultiplexers constitute a third example where 1-by-2 splitters are among the building blocks.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the several Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction must be carefully optimized.

The outputs of the optical modulators 105A-105D may be optically coupled via the waveguides 110 to the grating couplers 117E-117H. The couplers 103D-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from the PLC 145 into the photonically-enabled integrated circuit 130, and the grating couplers 117E-117H may comprise single polarization grating couplers (SPGCs) and may be utilized to couple light from the photonically-enabled integrated circuit 130 into the PLC 145. The grating couplers 117A-117D may comprise polarization splitting grating couplers (PSGCs). In instances where a PSGC is utilized, two input, or output, waveguides may be utilized.

The PLC 145 may be epoxied, for example, to the photonics chip 130, and optical signals communicated from the PLC 145 may be aligned at an angle from normal to the surface of the photonically-enabled integrated circuit 130 to optimize coupling efficiency. In an example embodiment, optical fibers may be coupled to the side of the PLC 145 in a lateral direction, for example, and may comprise single-mode fiber (SMF) and/or polarization-maintaining fiber (PMF).

Figure 1B:
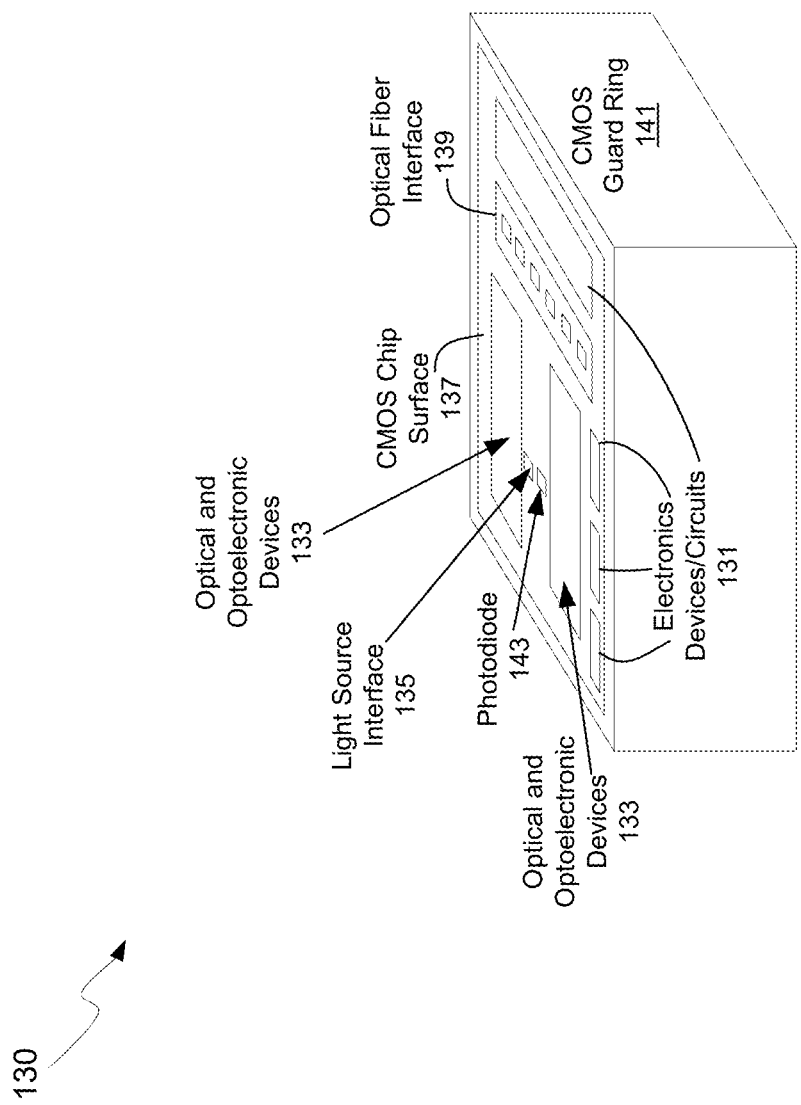
FIG. 1B is a diagram illustrating an exemplary photonically-enabled integrated circuit, in accordance with an example embodiment of the disclosure.

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 µm optical wavelength range, and may be integrated on a CMOS silicon-on-insulator (SOI) wafer. In an example scenario, the photodiodes 111A-111D may comprise different peak wavelengths and as such may be used for different CWDM channels.

In an example scenario, the PLC 145 may communicate CWDM signals received from one or more optical fibers to the photonics chip 130, and may split a single CWDM signal into multiple waveguides before coupling the signals to the grating couplers 117A-117D. The grating couplers may be tuned for different wavelengths, thereby providing coarse demultiplexing.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers coupled to the PLC 145 and coupled to the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

The transceivers on the chip 130 may comprise WDM and/or BiDi solutions formed via combinations of silicon photonics elements and external components. Furthermore, the structures may comprise silicon photonics coupling elements with integrated optical functions with multiplexing and/or demultiplexing functions. BiDi signaling may be utilized and/or may comprise polarization multiplexing.

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodiodes 111A-111D, and monitor photodiodes 113A-113I.

In an example scenario, the optical modulators 105A-105D may comprise rib waveguide structures with doping regions of opposite types placed at the four corners of the waveguide rib mimicking a four-petal cloverleaf arrangement. This may result in a structure with a cross-shaped depletion region between the four doping regions. Increased modal overlap results in better modulator performance, due to the increased intensity modulation for a given applied bias.

Figure 1C:
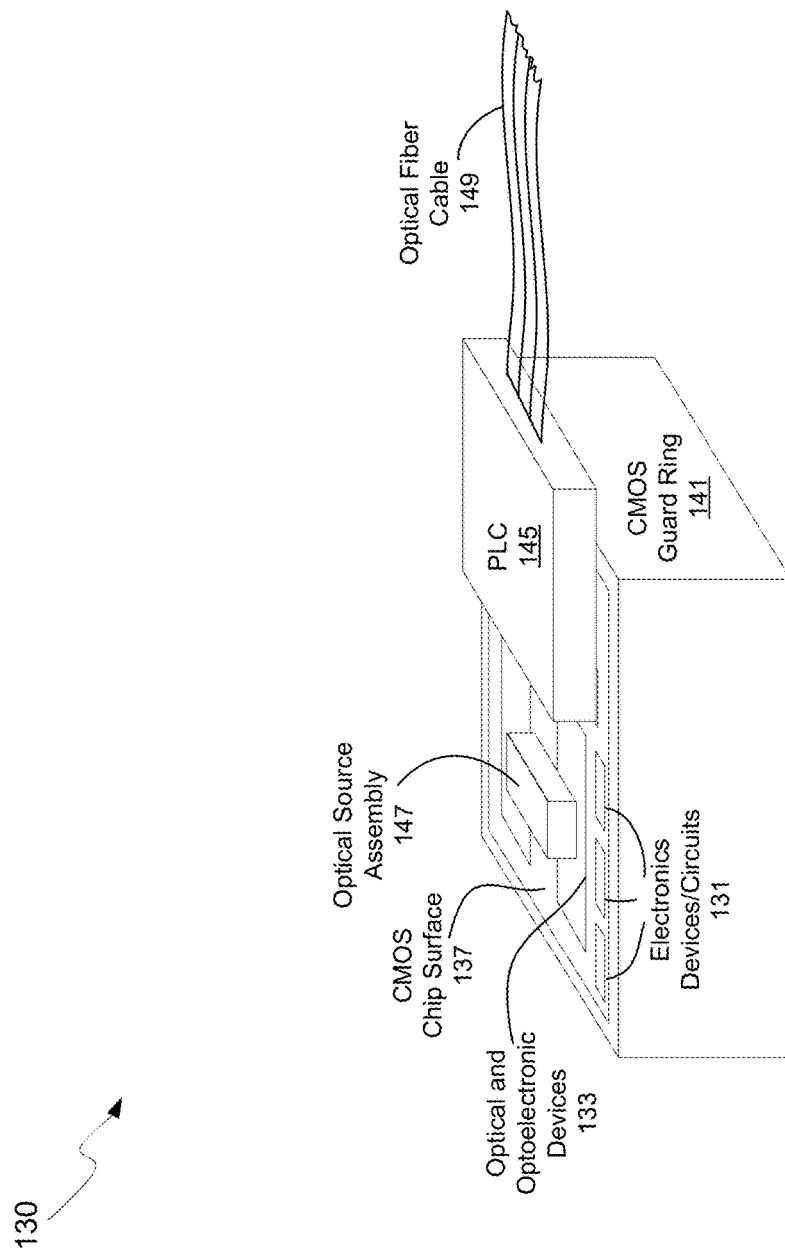
FIG. 1C is a diagram illustrating a photonically-enabled integrated circuit coupled to an optical fiber cable via a planar lightwave circuit, in accordance with an example embodiment of the disclosure.

FIG. 1C is a diagram illustrating a photonically-enabled integrated circuit coupled to an optical fiber cable via a planar lightwave circuit, in accordance with an example embodiment of the disclosure. Referring to FIG. 1C, there is shown the photonically-enabled integrated circuit 130 comprising the chip surface 137, and the CMOS guard ring 141. There is also shown a PLC 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B.

In an example embodiment, the PLC 145 may be affixed, via epoxy for example, to the CMOS chip surface 137. The PLC 145 enables the physical coupling of optical fibers to the photonically-enabled integrated circuit 130. In an example scenario, PLC 145 may be aligned to grating couplers on the top surface of the photonics IC 130 for communicating optical signals into and out of the IC 130.

Figure 2:
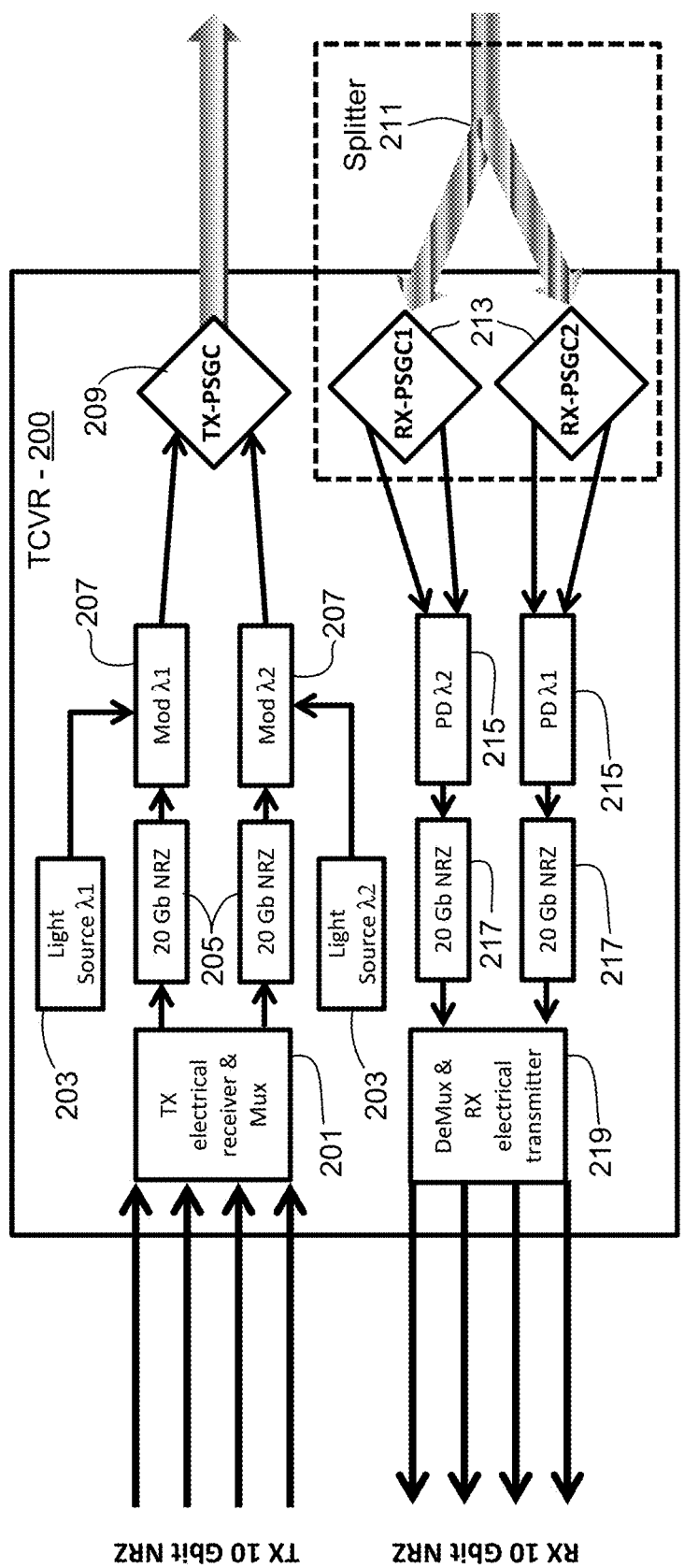
FIG. 2 depicts a block diagram of a two-wavelength wavelength division multiplexing transceiver without integrated control, in accordance with an example embodiment of the disclosure.

FIG. 2 depicts a block diagram of a two-wavelength wavelength division multiplexing transceiver without integrated control, in accordance with an example embodiment of the disclosure. Referring to FIG. 2, there is shown a transceiver 200 comprising Tx and Rx paths, as indicated by the Tx and Rx output and input NRZ signals. The electrical and optoelectronic components in FIG. 2 may be on a single chip, such as a complementary metal oxide semiconductor (CMOS) photonics chip, for example, or may be on a plurality of chips.

The transceiver 200 may comprise a Tx electrical receiver and multiplexer 201, light sources 203, non-return-to-zero (NRZ) modules 205, optical modulators 207, a Tx polarization-splitting grating coupler (PSGC) 209, an optical splitter 211, Rx PSGCs 213, Rx photodiodes 215, Rx NRZ modules 217, and a Demux and Rx electrical transmitter 219.

The TX path may comprise circuitry, optical components, and optoelectronic components for receiving electrical signals, such as four 10 GB NRZ data, for example, that may be processed and multiplexed by the TX receiver and multiplexer 201 into parallel 20 GB NRZ signals to be further processed by the NRZ modules 205 and then communicated as driver signals for the optical modulators 207. The bit rates and encoding schemes are merely examples, and as such the disclosure is not so limited.

The light sources 203 may comprise laser sources in assemblies coupled to a surface of the chip comprising the transceiver 200, similar to the light source assembly 147 shown in FIG. 1C, and may generate different wavelength continuous wave (CW) optical source signals.

In an example scenario, two modulators 207, such as Mach-Zehnder Interferometer (MZI) modulators, may receive the multiplexed electrical signals and modulate a CW optical signal in each path, resulting in modulated optical signals representing the data from the received electrical signals. These modulated signals may be combined in a TX polarization splitting grating coupler (PSGC) 209 and communicated out of the transceiver 200 in an optical fiber, for example.

The RX path may comprise circuitry, optical components, and optoelectronic components for receiving wavelength division multiplexed optical signals, such as coarse wavelength division multiplexed (CWDM) signals, but the disclosure is not limited to CWDM as other WDM signals may be utilized. In an example scenario, an external optical splitter 211 may communicate the CWDM optical signal to a pair of PSGCs 213 in the RX path. The PSGCs 213 may each receive a pair of optical signals and communicate them to one or more photodiodes 215 for each parallel RX path. The photodiodes 215 may be configured to convert different wavelength, $\lambda 1$ and $\lambda 2$, optical signals into electrical signals. In another example scenario, the photodiodes 215 may comprise a wide enough absorption region to convert optical signals of both wavelengths to electrical signals.

The NRZ modules 217 may process the generated electrical signals to clean up the signals by reducing noise before demultiplexing in the demux and RX transmitter 219, which may also provide further processing of the electrical signals before generating a plurality of 10 GB NRZ output electrical signals.

WDM and bi-directional (BiDi) systems use wavelengths over a wider optical bandwidth than can be efficiently accommodated with a single conventional grating coupler. In addition, the integrated control of WDM systems introduces control system challenges. In an example scenario, WDM and BiDi structures may be enabled with silicon photonics structures. One example, as shown in FIG. 2, utilizes an external splitter, such as the splitter 211, and parallel PSGCs 209 and 213. This combination of the external splitter 211 and the PSGCs 209 and 213 results in a passive two-wavelength multiplexer (mux) and demultiplexer (demux), i.e., without the need for integrated control. In an example scenario, the different wavelengths communicated by the transceiver 200 may be 1310 nm and 1490 nm, although other wavelengths may be utilized, depending on the light sources 203 and detectors/couplers in the transceiver 200, for example.

Figure 3A:
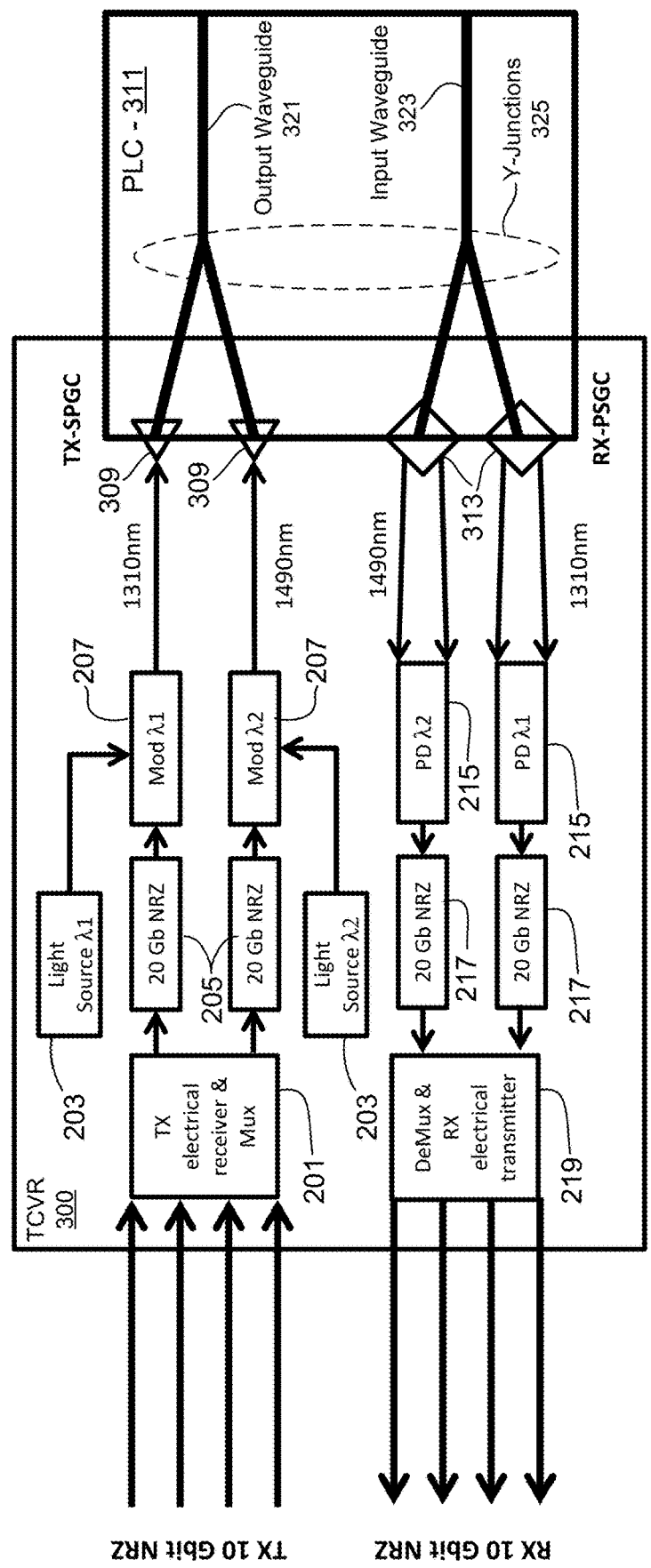
FIG. 3A illustrates a two-wavelength wavelength division multiplexing transceiver utilizing a planar lightwave circuit (PLC) splitter array, in accordance with an example embodiment of the disclosure.

FIG. 3A illustrates a two-wavelength wavelength division multiplexing transceiver utilizing a planar lightwave circuit (PLC) splitter array, in accordance with an example embodiment of the disclosure. Referring to FIG. 3A, there is shown two-wavelength CWDM transceiver 300 where similarly numbered elements, such as the Tx electrical receiver and multiplexer 201, light sources 203, non-return-to-zero (NRZ) modules 205, optical modulators 207, Rx photodiodes 215, Rx NRZ modules 217, and Demux and Rx electrical transmitter 219, may be the same or substantially similar to elements described with respect to FIG. 2.

The grating couplers 309 in the Tx path of the transceiver 300 may comprise single polarization grating couplers (SPGCs) for communicating optical signals to the PLC 311. Each SPGC 309 may receive a different wavelength modulated optical signal generated from a single CWDM signal and combine into a single optical signal utilizing a PLC splitter array in the PLC 311. The splitter array may be indicated by the Y-junctions 325 in the output and input optical waveguides 321 and 323 in the PLC 311.

The grating couplers 313 in the Rx path of the transceiver 300 may comprise polarization splitting grating couplers for receiving optical signals from the PLC 311 and coupling optical signals of different polarizations into waveguides in the transceiver 300 that couple the signals to the Rx photodiodes 215.

Optical signals of different wavelengths to be communicated out of the transceiver 300 may be coupled to the PLC 311 via the SPGCs 309. In an example scenario, the different wavelengths communicated by the transceiver 300 may be 1310 nm and 1490 nm, although other wavelengths may be utilized, depending on the light sources 103 and detectors/couplers in the transceiver 300, for example.

Similarly, PLC 311 may split a received composite signal stream of two wavelengths and into two streams of nominally equal strength, for example, although the disclosure is not so limited. In an example scenario, each stream may comprise both wavelengths from the received composite signal and in another scenario, the PLC 311 may split the composite signal into two different wavelength signals. One of the streams may be communicated to the directional coupler 313 where it may be coupled into the waveguide coupled to one of the PSGCs 113, e.g., the 1490 nm PSGC 313, while the other splitter output may be communicated to the 1310 nm PSGC 313. The received optical signals may then each be separated into two signals of different polarization by the PSGCs 313 before being communicated to the photodiodes 215.

The photodiodes 215, which may be sensitive to the respective wavelengths of the incoming optical signals, may convert the optical signals to electrical signals. The generated electrical signals may be conditioned by the NRZ modules 217 and then further demultiplexed by the demux and RX transmitter 219, which may also provide further processing of the electrical signals before generating a plurality of 10 GB NRZ output signals. While NRZ signals and modules are described with respect to FIG. 3A, this is merely an example as other data signals may be utilized, such as phase amplitude modulated (PAM-4) signals, for example.

Figure 3B:
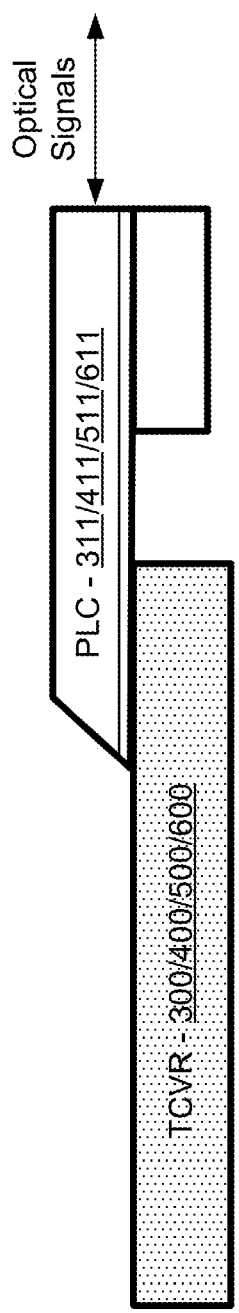
FIG. 3B illustrates a side view of a planar lightwave circuit (PLC) coupled to a photonic integrated circuit, in accordance with an example embodiment of the disclosure.

FIG. 3B illustrates a side view of a planar lightwave circuit (PLC) coupled to a photonic integrated circuit, in accordance with an example embodiment of the disclosure. Referring to FIG. 3B, there is shown PLC 311 on the transceiver 300, which in this example is on a single die. The PLC 311 and transceiver 300 are labeled as PLC 311/411/511/611 and transceiver 300/400/500/600 in the figure to indicate that this configuration is applicable to each figure. As can be seen, optical signals received from the right in FIG. 3B may be reflected down to couplers (not shown) on the top surface of the transceiver 300 and optical signals communicated from the transceiver 300 into the PLC 311 may be communicated out to the right. A splitter array in the PLC 311 may separate different wavelength signals to be directed to different grating couplers in the transceiver 300 and likewise combine different signals received from the transceiver 300 into a single signal to be communicated via an optical fiber (not shown) coupled to the PLC 311. Optical signals of different wavelengths to be communicated out of the transceiver 300 may be coupled to the PLC 311 via the SPGCs 309 of FIG. 3A. Furthermore, a reflective surface, indicated by the sloped surface in the PLC 311, may be utilized to redirect optical signals down to the transceiver 300 and from the transceiver 300 to the output of the PLC 311.

Figure 3C:
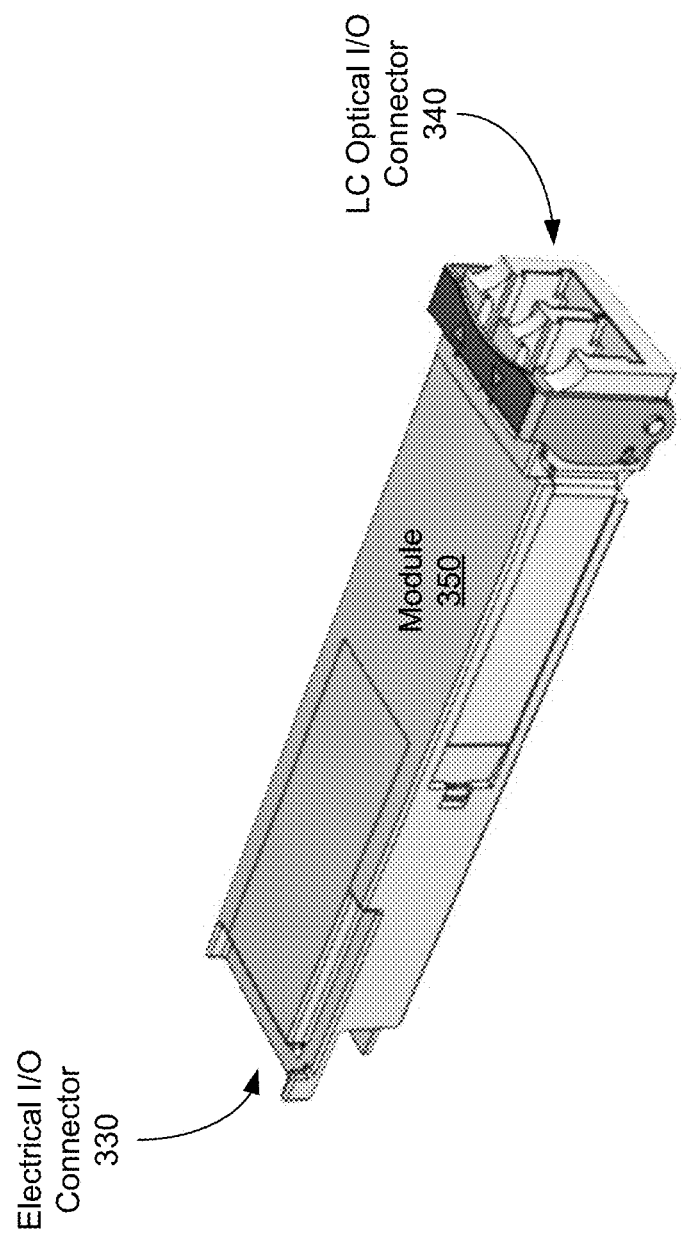
FIG. 3C illustrates a quad small form-factor pluggable (QSFP) module, in accordance with an example embodiment of the disclosure.

FIG. 3C illustrates a quad small form-factor pluggable (QSFP) module, in accordance with an example embodiment of the disclosure. Referring to FIG. 3C, there is shown a module 350 that comprises a 2-wavelength CWDM transceiver with LC connector duplex input/output. The PLC 311 may be coupled to one or more optical fibers that communicate optical signals to and from the LC optical IO Connector 340. In addition, the Electrical I/O connector 330 may be coupled to a server rack or other electronic device.

Figure 4:
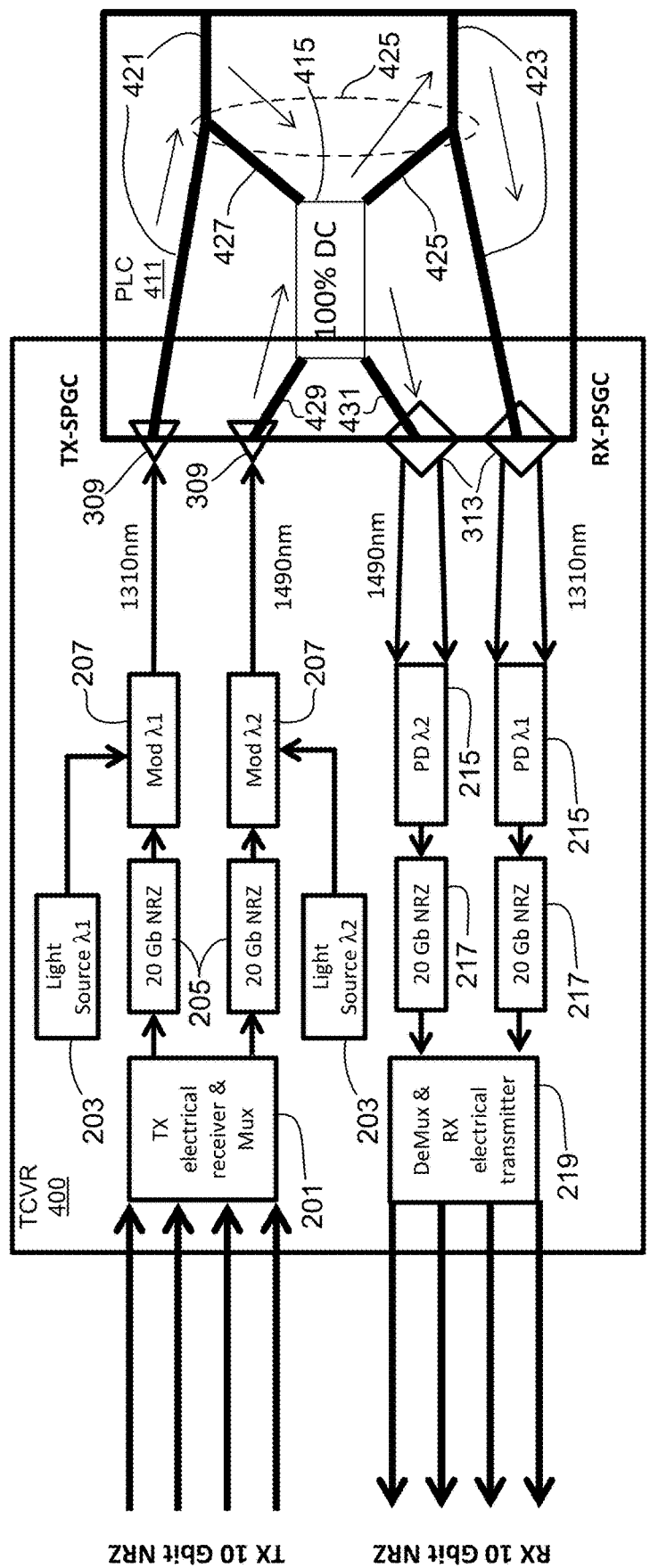
FIG. 4 illustrates a duplex bi-directional transceiver, in accordance with an example embodiment of the disclosure.

FIG. 4 illustrates a duplex bi-directional transceiver, in accordance with an example embodiment of the disclosure. Referring to FIG. 4, there is shown two-wavelength bi-directional CWDM transceiver 300 where similarly numbered elements, such as the Tx electrical receiver and multiplexer 201, light sources 203, NRZ modules 205, optical modulators 207, Rx photodiodes 215, Rx NRZ modules 217, and Demux ant Rx electrical transmitter 219, may be the same or substantially similar to elements described with respect to FIGS. 1-3. While NRZ signals and modules are described with respect to FIG. 3A, this is merely an example as other data signals may be utilized, such as phase amplitude modulated (PAM-4) signals, for example.

The couplers 309 in the Rx path of the transceiver 400 may comprise single polarization grating couplers (SPGCs) for communicating optical signals to the PLC 411, while the grating couplers 313 may comprise PSGCs and may couple optical signals from the PLC 411 to the transceiver 400. Each SPGC 309 may receive a different wavelength modulated optical signal generated from the modulators 207 and couple the signals to the waveguides 421 and 429 in the PLC 411. Similarly, the PSGCs 313 may receive optical signals from a single CWDM signal utilizing a PLC splitter array in the PLC 411. The PLC 411 may comprise a splitter array and a directional coupler 415, where the directional coupler 415 splits/combines optical signals, thereby enabling bi-directional two-wavelength data flow from the transceiver 300. The splitter array may be indicated by the multiple Y-junctions 425 in the optical waveguides 415, 421, 423, 425, 427, 429, and 431 in the PLC 411. The arrows along the waveguides indicate direction of optical signals in the PLC 411.

In operation, due to the bi-directional capability of the transceiver 300, optical signals may be communicated into and out of both the waveguides 421 and 423 of the PLC 411. The Y-junctions formed by the waveguides 421, 427, 423, and 425 split optical signals from one branch to the two remaining branches, such that the waveguides 421 and 423 may receive Tx signals from the transceiver 400 and also communicate optical signals received from external to the PLC 411 to the Rx portion of the transceiver 400. In this manner WDM BiDi systems are configured using a combination of silicon photonics elements, the transceiver 400, and external components, the PLC 411.

Figure 5:
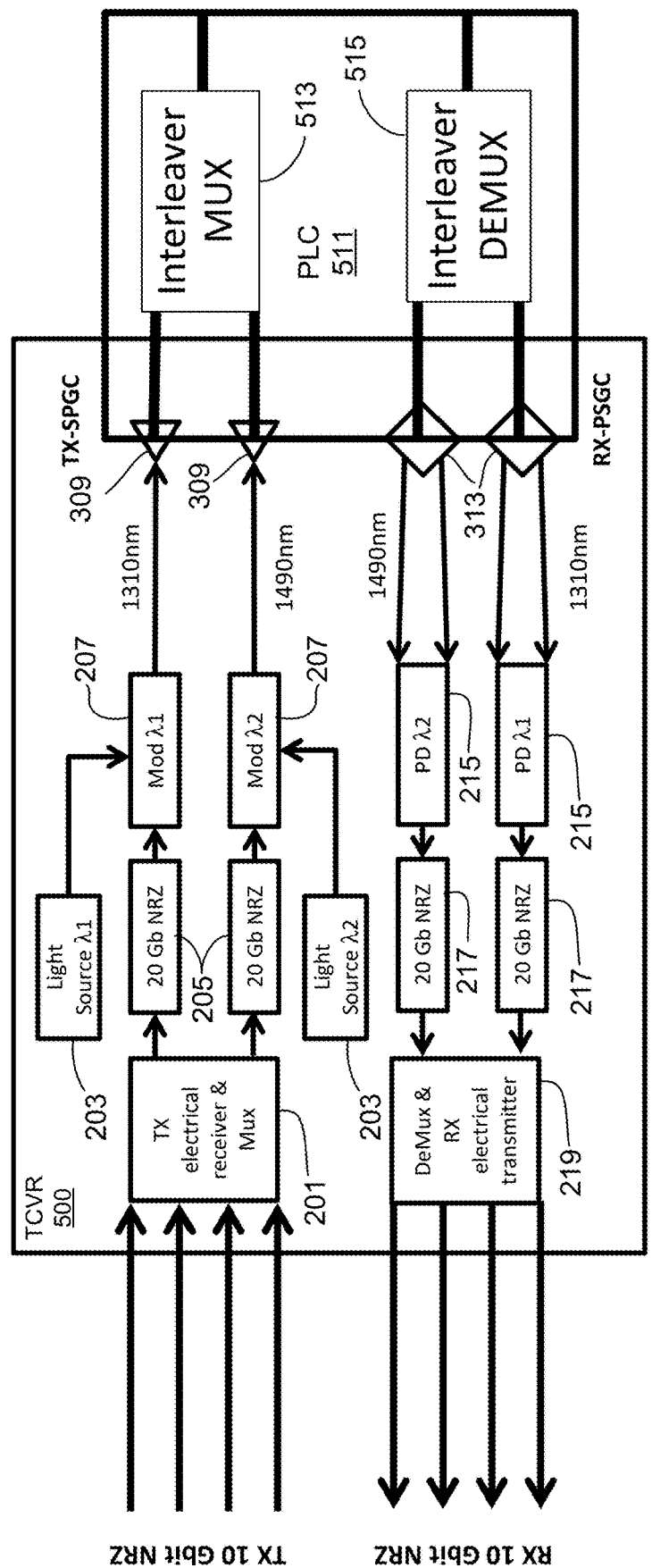
FIG. 5 illustrates a two-wavelength wavelength division multiplexing transceiver utilizing a planar lightwave circuit (PLC) interleaver, in accordance with an example embodiment of the disclosure.

FIG. 5 illustrates a two-wavelength wavelength division multiplexing transceiver utilizing a planar lightwave circuit (PLC) interleaver, in accordance with an example embodiment of the disclosure. Referring to FIG. 5, there is shown two-wavelength CWDM transceiver 500 where similarly numbered elements, such as the Tx electrical receiver and multiplexer 201, light sources 203, NRZ modules 205, optical modulators 207, Rx photodiodes 215, Rx NRZ modules 217, and Demux and Rx electrical transmitter 219, may be the same or substantially similar to elements described with respect to FIGS. 1-4.

The couplers 309 in the TX path of the transceiver 400 may comprise single polarization grating couplers (SPGCs) for communicating optical signals to the PLC 411, while the grating couplers 313 may comprise PSGCs and may couple optical signals from the PLC 411 to the transceiver 400. Each SPGC 309 may receive a different wavelength modulated optical signal generated from the modulators 207 and couple the signal to the PLC 411. Similarly, the PSGCs 313 may receive different wavelength optical signals from a single CWDM signal utilizing an interleaver demux 515 in the PLC 511.

The interleaver MUX 513 may comprise a 3-port passive fiber-optic device that may be used to combine two sets of DWDM channels (odd and even channels) into a composite signal stream in an interleaving way. For example, the interleaver MUX 513 may take two multiplexed signals with 100 GHz spacing and interleave them, creating a denser DWDM signal with channels spaced 50 GHz apart.

Similarly, the interleaver demux 515 may take a received composite signal stream of two wavelengths and separate it into two streams of each wavelength. These two streams may then be communicated to the PSGCs 313 where they may be separated into two signals of different polarization before being communicated to the photodiodes 215. The photodiodes 215, which may be sensitive to the respective wavelengths of the incoming optical signals, may convert the optical signals to electrical signals. The generated electrical signals may be conditioned by the NRZ modules 217 and then further demultiplexed by the demux and RX transmitter 219, which may also provide further processing of the electrical signals before generating a plurality of 10 GB NRZ output signals.

The transceiver 500 and PLC 511 may be arranged as shown in FIG. 3B, where optical signals received from the right may be reflected down to couplers on the top surface of the transceiver 500 and optical signals communicated from the transceiver 500 into the PLC 511 may be communicated out to the right of the PLC 511. The interleaver demux 515 in the PLC 511 may separate different wavelength signals to be directed to different grating couplers in the transceiver 500 and likewise the interleaver mux 513 may combine different signals received from the transceiver 500 into a single signal to be communicated via an optical fiber (not shown) coupled to the PLC 511. Optical signals of different wavelengths to be communicated out of the transceiver 500 may be coupled to the PLC 511 via the SPGCs 309. In an example scenario, the different wavelengths communicated by the transceiver 500 may be 1310 nm and 1490 nm, although other wavelengths may be utilized, depending on the light sources 203, detectors/couplers in the transceiver 500, and fiber requirements, for example.

Figure 6:
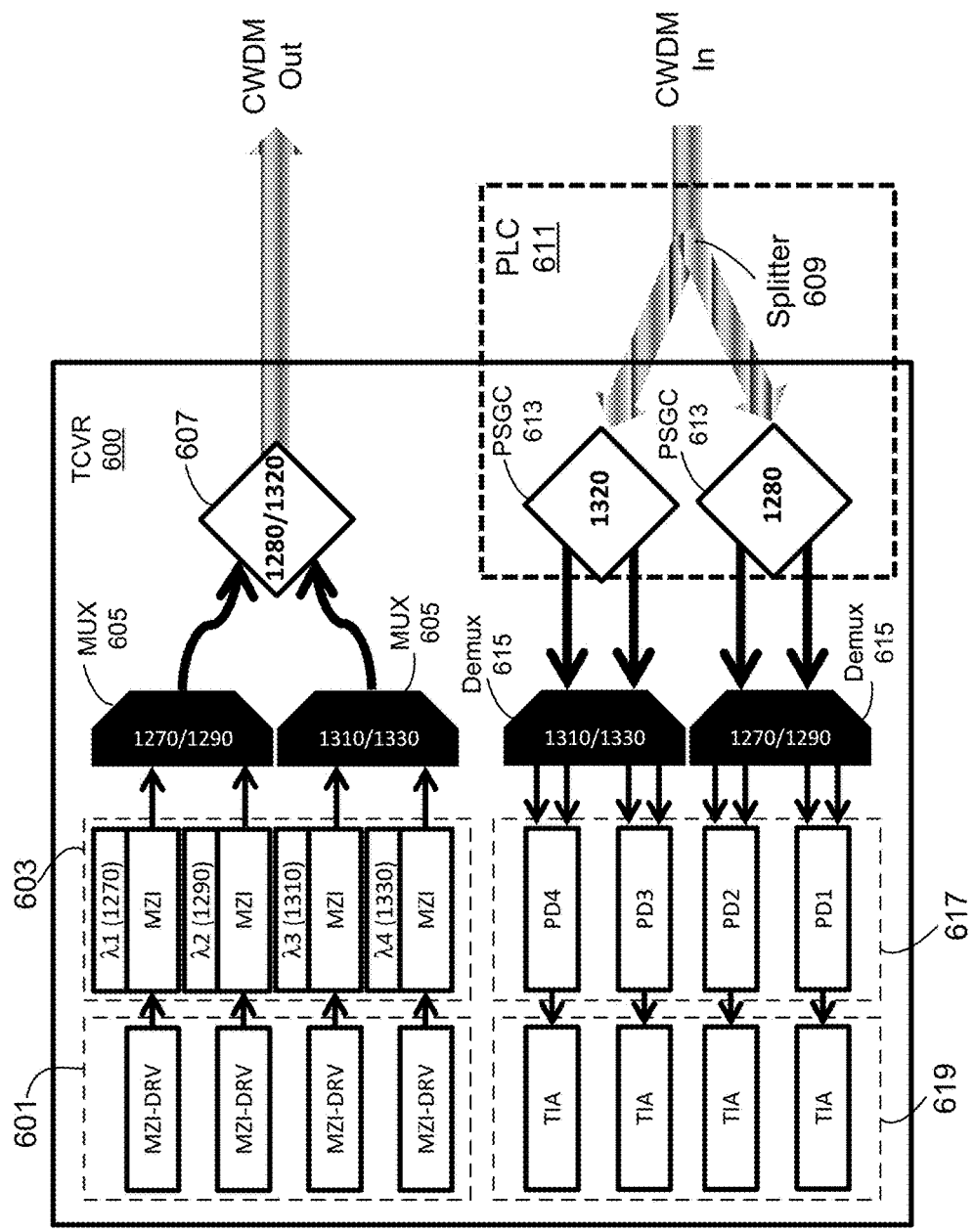
FIG. 6 illustrates a four-wavelength wavelength division multiplexing transceiver utilizing fine and multiplexing/demultiplexing, in accordance with an example embodiment of the disclosure.

FIG. 6 illustrates a four-wavelength wavelength division multiplexing transceiver utilizing fine and coarse multiplexing/demultiplexing, in accordance with an example embodiment of the disclosure. Referring to FIG. 6, there is shown four-wavelength CWDM transceiver 600 where similarly named or numbered elements may be the same or substantially similar to elements described with respect to FIGS. 1-5.

The Tx path may comprise a plurality of drivers 601, modulators 603, fine multiplexers 605, and PSGCs 607, that may act as coarse multiplexers. The drivers 601 may comprise MZI driver circuitry for providing an electrical signal to the modulators 603 for modulating optical signals. In an example scenario, the modulators 603 comprise Mach-Zehnder interferometers and the drivers 601 provide electrical current/voltage that is applied to the modulators 603, such that the dielectric constant of the waveguides in the modulators 603 is modified, thereby changing the phase of the optical signals communicated via the waveguide. In an example scenario, the modulators 603 may each modulate a CW optical signal with a different wavelength. For example, the wavelengths may be 1270, 1290, 1310, and 1330 nm, resulting in a 20 nm channel separation.

The multiplexers 605 may each receive two modulated signals of different wavelength and generate a single multiplexed optical signal. This may be considered to be a "fine" mux separation in the transceiver 600.

The PSGC 607 may be configured to receive the multiplexed optical signals, with each set of wavelengths communicated to a different input of the PSGC 607. In an example scenario, the wavelengths of each branch may be centered at 1280 nm and 1320 nm, resulting in the "coarse" multiplexing of the TX side.

On the RX side, a multiplexed optical signal may be split by a splitter 609, which may be external to the chip on which the transceiver 600 is integrated, in the PLC 611 and communicated to the PSGCs 613. In an example scenario, the wavelength separation in the branches of the PSGCs 613 may be 40 nm, at 1280 and 1320 nm, for example. This may provide the "coarse" demultiplexing on the RX side.

The PSGCs 613 may take a received composite signal stream of two wavelengths and separate it into two streams of each wavelength. These two streams may then be communicated to the demultiplexers 615, which may have 20 nm wavelength spacing, for example, thereby providing the "fine" demultiplexing in the RX side. The photodiodes 617, which may be sensitive to the respective wavelengths of the incoming optical signals, may convert the optical signals to electrical signals that may then be amplified by the transimpedance amplifiers (TIAs) 619. The resulting electrical signals may comprise a plurality of 25 GB NRZ or 100 G PAM-4 output signals, for example.

As illustrated in FIGS. 1-6, the transceivers disclosed may comprise WDM and/or BiDi solutions formed via combinations of silicon photonics elements and external components. Furthermore, the structures may comprise silicon photonics coupling elements with integrated optical functions with multiplexing and/or demultiplexing functions. BiDi signaling may be utilized and/or may comprise polarization multiplexing.

In an example embodiment, a method and system are disclosed for partial integration of wavelength division multiplexing and bi-directional solutions. In this regard, aspects of the disclosure may comprise performing a method in an optical transceiver on a silicon photonics integrated circuit coupled to a planar lightwave circuit (PLC), where the silicon photonics integrated circuit includes a first modulator and first light source that operates at a first wavelength and a second modulator and second light source that operates at a second wavelength. The method may comprise, for example, modulating a first continuous wave (CW) optical signal from the first light source utilizing the first modulator driven by a first electrical signal and modulating a second CW optical signal from the second light source utilizing the second modulator driven by a second electrical signal.

First and second modulated signals may be communicated from the first and second modulators to the PLC utilizing a first pair of grating couplers in the silicon photonics integrated circuit. The first and second modulated signals may be combined in the PLC. A third modulated optical signal may be received via the PLC and split into fourth and fifth modulated optical signals in the PLC. The fourth and fifth modulated optical signals may be communicated to a second pair of grating couplers in the silicon photonics integrated circuit. The fourth modulated optical signal may be converted to a third electrical signal utilizing a first photodetector configured to detect at the first wavelength and the fifth modulated optical signal may be converted to a fourth electrical signal utilizing a second photodetector configured to detect at the second wavelength. The PLC may include a directional coupler and/or optical splitters.

The first and second light sources may be in a light source assembly coupled to a surface of the silicon photonics integrated circuit. The first pair of grating couplers may include single polarization grating couplers and the second pair of grating couplers may include polarization splitting grating couplers. The PLC may include an interleaver multiplexer and an interleaver demultiplexer. The silicon photonics integrated circuit may include a multiplexer for combining said first and second modulated optical signals. The silicon photonics integrated circuit may include a demultiplexer for separating said fourth and fifth modulated optical signals. The silicon photonics integrated circuit may be in a complementary-metal oxide semiconductor (CMOS) die.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for optical communication, the method comprising:
    in an optical transceiver on a silicon photonics integrated circuit coupled to a planar lightwave circuit (PLC), said silicon photonics integrated circuit comprising a first modulator and first light source that operates at a first wavelength coupled to said silicon photonics integrated circuit and a second modulator and second light source that operates at a second wavelength coupled to said silicon photonics integrated circuit:
        modulating a first continuous wave (CW) optical signal from said first light source utilizing said first modulator;
        modulating a second CW optical signal from said second light source utilizing said second modulator;
        communicating first and second modulated signals from said first and second modulators to said PLC utilizing one or more output grating couplers in said silicon photonics integrated circuit;
        combining said first and second modulated signals in said PLC;
        receiving a third modulated optical signal via said PLC;
        splitting said third modulated optical signal into fourth and fifth modulated optical signals in said PLC;
        communicating said fourth and fifth modulated optical signals to one or more input grating couplers in said silicon photonics integrated circuit;
        converting said fourth modulated optical signal to a first electrical signal utilizing a first photodetector configured to detect at said first wavelength; and
        converting said fifth modulated optical signal to a second electrical signal utilizing a second photodetector configured to detect at said second wavelength.

2. The method according to claim 1, wherein said PLC comprises a directional coupler.

3. The method according to claim 1, wherein said first and second light sources are in a light source assembly coupled to a surface of the silicon photonics integrated circuit.

4. The method according to claim 1, wherein said PLC comprises optical splitters.

5. The method according to claim 1, wherein said one or more output grating couplers comprise single polarization grating couplers.

6. The method according to claim 1, wherein said second one or more input grating couplers comprise polarization splitting grating couplers.

7. The method according to claim 1, wherein said PLC comprises an interleaver multiplexer and an interleaver demultiplexer.

8. The method according to claim 1, wherein said silicon photonics integrated circuit comprises a multiplexer for combining said first and second modulated optical signals.

9. The method according to claim 1, wherein said silicon photonics integrated circuit comprises a demultiplexer for separating said fourth and fifth modulated optical signals.

10. The method according to claim 1, wherein the silicon photonics integrated circuit is in a complementary-metal oxide semiconductor (CMOS) die.

11. A system for communication, the system comprising:
    an optical transceiver on a silicon photonics integrated circuit coupled to a planar lightwave circuit (PLC), said silicon photonics integrated circuit comprising a first modulator and first light source that operates at a first wavelength coupled to said silicon photonics integrated circuit and a second modulator and second light source that operates at a second wavelength coupled to said silicon photonics integrated circuit, said system being operable to:
        modulate a first continuous wave (CW) optical signal from said first light source utilizing said first modulator;
        modulate a second CW optical signal from said second light source utilizing said second modulator;
        communicate first and second modulated signals from said first and second modulators to said PLC utilizing one or more output grating couplers in said silicon photonics integrated circuit;
        combine said first and second modulated signals in said PLC;
        receive a third modulated optical signal via said PLC;
        split said third modulated optical signal into fourth and fifth modulated optical signals in said PLC;
        communicate said fourth and fifth modulated optical signals to one or more input grating couplers in said silicon photonics integrated circuit;
        convert said fourth modulated optical signal to a first electrical signal utilizing a first photodetector configured to detect at said first wavelength; and
        convert said fifth modulated optical signal to a second electrical signal utilizing a second photodetector configured to detect at said second wavelength.

12. The system according to claim 11, wherein said PLC comprises a directional coupler.

13. The system according to claim 11, wherein said first and second light sources are in a light source assembly coupled to a surface of the silicon photonics integrated circuit.

14. The system according to claim 11, wherein said PLC comprises optical splitters.

15. The system according to claim 11, wherein said one or more output grating couplers comprise single polarization grating couplers.

16. The system according to claim 11, wherein said one or more input grating couplers comprise polarization splitting grating couplers.

17. The system according to claim 11, wherein said PLC comprises an interleaver multiplexer and an interleaver demultiplexer.

18. The system according to claim 11, wherein said silicon photonics integrated circuit comprises a multiplexer for combining said first and second modulated optical signals.

19. The system according to claim 11, wherein said silicon photonics integrated circuit comprises a demultiplexer for separating said fourth and fifth modulated optical signals.

20. A system for communication, the system comprising:
    an optical transceiver on a silicon photonics integrated circuit coupled to a planar lightwave circuit (PLC), said silicon photonics integrated circuit comprising a first modulator and first light source that operates at a first wavelength coupled to said silicon photonics integrated circuit and a second modulator and second light source that operates at a second wavelength coupled to said silicon photonics integrated circuit, said system being operable to:

modulate a first continuous wave (CW) optical signal from said first light source utilizing said first modulator;

modulate a second CW optical signal from said second light source utilizing said second modulator;

communicate first and second modulated signals from said first and second modulators to said PLC utilizing one or more single polarization grating couplers in said silicon photonics integrated circuit;

combine said first and second modulated signals in said PLC;

receive a third modulated optical signal via said PLC;

split said third modulated optical signal into fourth and fifth modulated optical signals utilizing an optical splitter in said PLC;

communicate said fourth and fifth modulated optical signals to one or more polarization splitting grating couplers in said silicon photonics integrated circuit;

convert said fourth modulated optical signal to a first electrical signal utilizing a first photodetector configured to detect at said first wavelength; and convert said fifth modulated optical signal to a second electrical signal utilizing a second photodetector configured to detect at said second wavelength.

* * * * *